United States Patent Office 3,293,131
Patented Dec. 20, 1966

3,293,131
FAT-SOLUBLE VITAMIN CONTAINING FEED SUPPLEMENTS
Charles M. Ely, Berkeley Heights, Anthony P. de Luca, Newark, and Melvin J. MacMillan, Cranford, N.J., assignors to Nopco Chemical Company, Newark, N.J., a corporation of New Jersey
No Drawing. Filed Feb. 23, 1962, Ser. No. 175,288
16 Claims. (Cl. 167—81)

This invention relates to fat soluble vitamin containing animal feed supplements. More particularly this invention relates to fat soluble vitamin containing feed supplements which, when ingested by an animal, increases the amount of the fat soluble vitamin which is biologically available to the animal.

The many and diverse problems associated with the fortification of stock and poultry feeds with fat soluble vitamins, has been given considerable attention by researchers in recent years. One of the main purposes of the research in this field is, and has been, to develop a supplement capable of providing fat soluble vitamins in a completely biologically available form. Great strides have been made toward achieving this aim. One example of a recently developed class of products whose properties approach the desired result, are the products disclosed in U.S. Patent 2,777,798, Hochberg and Macmillan. This patent discloses and claims products comprised of a multiplicity of small, solid, spheroidal shaped particles each consisting essentially of (1) a normally solid wax-like material, (2) a fat-soluble vitamin-containing material, (3) an edible surface active agent and (4) an edible antioxidant. While products such as these, as well as products of U.S. 2,777,797, Hochberg and MacMillan, and certain others disclosed in the prior art, have been proven to increase the biological availability of fat soluble vitamins, improved products are still being sought. A particular aim of the continuing research in this field is to provide an animal feed supplement containing fat soluble vitamins wherein greater amounts of fat soluble vitamins are biologically available to an animal when ingested, than was previously possible.

An object of this invention therefore is to provide a fat soluble vitamin containing product having greater biological availability of the fat soluble vitamin upon ingestion by an animal, than was previously possible.

Other objects and advantages will become apparent from the following more complete description and claims.

It has been unexpectedly discovered that the above as well as other objects can be accomplished in the following manner.

Broadly, this invention contemplates a dry composition of matter comprising an edible oil absorbant puffed material, a fat soluble vitamin containing material, said fat soluble vitamin containing material being absorbed on said edible oil absorbant puffed material.

This invention also contemplates a process for increasing the amount of fat soluble vitamins biologically available to animals comprising the steps of adding a fat soluble vitamin to an edible ground puffed material and mixing, whereby said fat soluble vitamin is absorbed on said edible ground puffed material. This invention also contemplates the feeding of animals with such products.

The term spheroidal is used herein to include not only particles which are spheroidal in shape, but also particles which are truly spherical in shape. The term wax-like material is used herein to connote normally solid glycerides, other fatty acid esters, free fatty acids, vegetable waxes, and similar materials or mixtures of such materials.

As used in the specification and claims, the term puffed includes both puffed and exploded edible materials such as materials prepared by processes used to prepare breakfast cereals such as "Kix," etc. The term fat soluble as used herein connotes vitamin sources which are solids and soluble in oil, as well as liquid vitamin sources themselves.

Generally speaking, the compositions of this invention can be prepared by contacting a source of at least one fat soluble vitamin containing material with ground puffed or exploded materials and mixing the two until a homogeneous mixture is obtained. The fat soluble source and the ground puffed or exploded materials may be mixed in any suitable manner as long as a homogeneous mixture is obtained. The length of time that the materials are mixed in is not critical so long as the time of mixing is sufficient to produce a uniform mixture to assure that a dry product results. Whether or not a uniform mixture has been produced may be determined upon visual inspection. If a uniform mixture has been obtained, then the mass will be free of color striations and free of white spotting.

If desired, the ground puffed material can first be added to other materials and the fat-soluble vitamin containing source added to the mixture and the entire mixture then blended into a homogeneous mixture.

We use ground puffed or exploded materials because we have found that these ground puffed or ground exploded materials remain in a dry, i.e. non-tacky, state even after a weight of fat-soluble vitamin, as for example, vitamin A palmitate, equal to the weight of the ground puffed materials has been absorbed by the puffed materials. We have found that in some manner which is not fully understood the compositions of this invention are effective in increasing the biological utilization of fat-soluble vitamins when ingested by the animal, when compared with prior art compositions.

We may use any edible puffed or exploded material prepared from the following: rice, corn (including popcorn), wheat, oats barley, rye, buckwheat, "Celluflour" (exploded wood), and the like. Where popcorn is used, we contemplate exploding the popcorn only without using a heated oil as the exploding means. After the materials have been puffed or exploded, they should be ground before the fat soluble vitamin containing source is added thereto.

In order for a ground, puffed or exploded material to be considered for use in preparing the compositions of this invention, it should have a bulk density such, that 100 cc. of puffed or exploded material will weigh no more than 18 grams.

Any ratio of a fat soluble vitamin to ground puffed material may be used up to about one part by weight of the fat soluble vitamin containing material for each part of puffed or exploded material used. It is only necessary that a sufficient amount of the vitamin be present in order to achieve the beneficial effects of feeding a fat soluble vitamin to animals. If more than equal parts by weight of a fat soluble vitamin containing material is used, then the composition tends to become tacky, and is no longer considered as being in a dry state.

If the fat soluble vitamin-puffed material composition is tacky, then it will be difficult to handle and when fed to animals, either alone or with other ingredients, the biological availability of the fat soluble vitamin will not be appreciably increased. The puffed or exploded materials on which a fat soluble vitamin has been absorbed can be added, alone or with other materials, to an animal feed. In addition, the puffed materials may be used to replace a portion of, or all of, a non-puffed vegetable flour where used in a vitamin concentrate.

Any amount of puffed material on which a fat soluble vitamin has been absorbed can be added to other ingredients such as are found in a vitamin concentrate. The amount which can be used is limited only by practical and economic considerations.

Other ingredients besides the fat soluble vitamin and puffed materials may be present. Among such materials are anti-oxidants. An anti-oxidant should be present to prevent oxidation of the fat soluble vitamin, such as vitamin A. If desired, a surface active material may also be present. Anti-oxidants and surface active materials are later described in this specification. Other ingredients which can be added are well known in the art and need not be discussed here.

While it is true that puffed materials which have absorbed a fat soluble vitamin can be added to any feed composition or mixed with other materials to form a vitamin concentrate, we prefer to use these puffed materials in conjunction with, and as part of, the fat soluble vitamin concentrate of U.S. Patent 2,777,797 and 2,777,798.

The fat soluble vitamins which we can use are vitamins A, D and E.

In preparing the preferred vitamin concentrate products of our invention, a puffed material on which a fat soluble vitamin has been absorbed is added to other ingredients which are known in the art, along with an edible anti-oxidant and an edible surface active material and blended to form a uniform mixture. The uniform mixture is then usually heated, but not necessarily, and a normally solid wax-like material is then melted and admixed therewith. Care is taken to keep the mixture containing the melted wax-like material and the fat soluble vitamin absorbed puffed material in a molten state. Thereafter the molten mixture which has thus been prepared is formed into a multiplicity of very small solid spheroidal particles by any suitable method. Such a molten mass contains all of said components, substantially uniformly distributed with respect to each other. While in said condition at elevated temperture, the mass, in any convenient and desired manner, is converted or formed into droplets or small globules whose temperature is reduced to convert them to the solid state or to cause solidification thereof.

There are two general methods for preparing such particles which we have found to be highly satisfactory, but means other than these two methods can, of course, be used. One of the methods by which the desired spheroidal particles may be prepared involves a process which we shall refer to as a "centrifugal" process. In such a process the molten mixture of the ingredients which make up the composition, that is the mixture of the essential components of the invention is in the molten state at elevated temperature with the components being substantially uniformly distributed throughout, is placed in or lead into a rapidly rotating vessel, the sides of which contain numerous small perforations. Such perforations may be placed anywhere along the sides of the vessel. Also, either a vessel which is substantially a cylinder or a vessel which is in the shape of an inverted cone with perforations only at the top part of the sides of the cone may be used. As the vessel rapidly rotates, the melted mixture will flow out of the perforations in the side of the vessel and will be thrown for a considerable distance through the air, e.g. about 10 to 15 feet or more, due to the centrifugal force. As the melted mixture passes through the perforations in the side of the vessel, it is broken up into a multiplicity of very small spheriodal particles. These particles, which are liquid when they leave the vessel, cool very rapidly as they pass through the air, and by the time they fall to the floor of the room in which the rotating vessel is located they will have substantially solidified, and under practically all conditions it will be found that these solid particles will be practically perfect spheres. In some cases, the particles will not be true spheres but they will be so nearly so that they are properly described as being spheroidal in shape. In the other method which we may employ in forming the spheroidal particles make up the preferred compositions of our invention, we pass the molten mixture of ingredients through a spray gun or similar spraying device. As the finely subdivided molten particles pass through the atmosphere after being forced through the spraying device, they rapidly cool and form solid spheroidal particles just as in the case when the molten mixture of ingredients is passed through a centrifugal device of the type described above. In both of these processes the molten mixture of ingredients is preferably at a temperature such that the mixture flows readily and will flow through the perforations of the rapidly rotating vessel or through the spray device without tending to clog up the perforations of the rotating vessel or the openings in the spray device. The speed at which the centrifugal apparatus is rotated may vary, of course, but we have found that a rotation of from about 200 to about 1500 revolutions per minute will give very satisfactory products. The pressure which is used in the various types of spraying devices can vary to some extent, of course, although in all cases sufficient pressure will be required to cause the hot molten mixture to be broken up into very small droplets. These droplets cool quite rapidly as they pass through the air, and by the time they fall to the floor of the room in which the spray device is located, they will have formed a multiplicity of small solid spheroidal particles. The spray device may conveniently be located near the ceiling of a room having a rather high ceiling or it may be located near the top of a tall tower with the nozzle of the spray device being directed downwardly. However, such an arrangement is not necessary and, if desired, one may locate the spray device on or near the floor of the room in which the spray device is placed. The nozzle of the spray device is then directed so that the initial path of the droplets will be at least parallel to the floor of the room or at an angle slightly above a line parallel with the floor of the room. Of course, in such a case the pressure which is employed in forcing the hot liquid mixture through the spray device will have to be high enough to cause the small droplets which are formed to travel through the air for a distance sufficient to allow the droplets to solidify substantially before they fall to the floor of the room. In most cases it is preferred either that the spray device be placed so that the droplets will have a free fall from the nozzle of the spray device to the floor of the room of from about 15 to 20 feet or more or that sufficient pressure be employed in the spray device to force the droplets through the air for a similar distance before they fall to the floor of the room. In most cases a pressure of about 10 pounds per square inch is satisfactory when the droplets are allowed to cool by a free fall through the air. Pressures of from about 5 to 100 pounds per square inch may be used, however, if desired. When the spray device is located on or near the floor of the room and the hot molten mixture is sprayed out in a direction roughly parallel to the floor of the room, it is usually desirable to employ a pressure of at least about 15 pounds per square inch in the spray device in order to insure that the individual droplets will pass through the air for a distance sufficient to allow them to solidify substantially before they fall to the floor of the room. The perforations in the centrifugal apparatus and the openings in the spray device are designed or adjusted so as to give solid spheroidal particles having a diameter such that the majority of the particles will pass through a 10 mesh screen but will not pass through a 100 mesh screen. In the centrifugal type devices, perforations in the sides of the vessels having a diameter of from about $\frac{1}{16}$ to $\frac{1}{32}$ of an inch will ordinarily give satisfactory products. The size of the openings in the spray type devices will depend somewhat upon the amount of pressure being used to force the molten mixtures through the devices. Such devices can be readily adjusted in every case, however, to give spheroidal particles of the desired size.

In nearly all cases, the spheroidal particles which are obtained will be free flowing and will not tend to adhere to each other by any appreciable extent. If it is found that the spheroidal particles do have a tendency to adhere somewhat to each other, such tendency may be readily overcome merely by dusting these particles with a very small amount of a vegetable flour such as ground soy bean meal, alfalfa leaf meal, peanut meal, and the like.

An outstanding advantage of our invention is that it is now possible to use fat soluble vitamin containing materials which have a potency substantially lower than the potency of the fat soluble vitamin containing materials which must be used with products such as those prepared in accordance with the teachings of U.S. Patent No. 2,401,293. If desired, of course, one may use highly potent fat soluble vitamin containing materials in preparing the products of our invention, and if it is desired to obtain dry carriers having a very high potency, it is preferred to employ highly potent fat-soluble vitamin containing materials in preparing such carriers. In preparing dry carriers which are to be added to stock and poultry feed to enrich the fat-soluble vitamin content thereof, it is not necessary to use highly potent fat-soluble vitamin containing materials, but instead fat-soluble vitamin containing oils having a low vitamin potency may be used. For example, many stock and poultry feeds are fortified with vitamin A so that they will have a potency of approximately 5 units of vitamin A per gram. To prepare dry carriers suitable for fortifying feeds to such an extent, we can use fat-soluble vitamin A containing oils having a rather low potency inasmuch as dry carriers prepared for such use need not have a potency in excess of about 1000 or 2000 units of vitamin A per gram.

In most cases we prefer that the preferred vitamin concentrate products of our invention when they are carriers for vitamin A, have a potency of at least about 1000 units of vitamin A per gram and that the products of our invention which are carriers for vitamin D have a potency of at least 100 units of vitamin D per gram.

As a source of the fat-soluble vitamins, we may use any natural or artificially produced fat-soluble vitamins. We may use activated sterols such as irradiated ergosterol or irradiated 7-dehydrochloestrol, vitamin A in ester or alcohol forms, vitamin A which has been produced by synthetic methods, fish oils, fish liver oils, vitamin concentrates prepared from such oils, etc. As a source of vitamin E, we may use materials such as dl-α-tocopheryl acetate, wheat germ oil, and the like.

The amount of fat-soluble vitamin material in the preferred composition of our invention may vary from any desired minimum amount up to as much as about 40% of the total weight of the preferred compositions.

The normally solid wax-like materials which are used in preparing the preferred vitamin concentrate products of the invention can be selected from glycerides and other fatty acid esters, fatty acids, vegetable waxes, or petroleum waxes or mixtures of such materials which have a melting point of about 45° C. or above. Among such materials are hydrogenated fats and oils such as coconut oil, cottonseed oil, peanut oil, soybean oil and fish oils, fatty acids such as stearic acid, mineral waxes such as the various petroleum waxes, vegetable waxes such as carnauba wax, candelilla wax, esparto wax, ouricury wax, etc. The hydrogenated fats and oils which are preferably employed are those having very low iodine values, that is, below 10 and for certain purposes approximately zero. In all cases, the melting point of the wax-like material used is at least about 45° C. For certain uses of the novel compositions of this invention, the wax-like materials having high minimum melting points such as 60° C. and 70° C. are employed. Consequently, in one of the embodiments of the invention, the melting point of the wax-like material is at least 45° C., while in two other embodiments, it is at least 60° C. and at least 70° C., respectively. The percentage of the normally solid wax-like material present in the preferred compositions of this invention may be in the range of about 10–75% by weight of the entire composition, depending upon the specific characteristics and proportions of the other components therein. For chiefly commercial purposes, however, the percentage of the normally solid wax-like material in the preferred vitamin concentrate compositions of this invention is in the range of 15–70% by weight.

Among the antioxidants which may be incorporated into the products of our invention, there may be mentioned compounds such as propyl gallate, butylated hydroxy anisole, gallic acid, nordihydroguaiaretic acid, ethoxyquin, etc. These compounds are all edible antioxidants. Also, one can use other edible antioxidants such as vitamin E, mixed tocopherols and natural antioxidants of the types described and claimed in U.S. Patents No. 2,345,576, No. 2,345,578, No. 2,433,593 and No. 2,434,790, natural antioxidants produced by the processes described and claimed in U.S. Patents No. 2,396,680 and No. 2,396,681 as well as any similar edible antioxidants. In fact any edible antioxidant can be employed if desired. Also one can use mixtures of any of these antioxidants, or one can use mixtures of one or more of these various antioxidants with a compound or compounds having little or no antioxidant effect in themselves but which when admixed with any of the antioxidants exert a synergistic effect thereon. Such compounds, which are often referred to as "synergists," are lecithin, citric acid, alkyl phosphates, etc. As far as the amount of antioxidant which is to be incorporated into the preferred vitamin concentrate products of our invention is concerned, it is preferred to use at least about 1.0% of antioxidant by weight of the product in most cases but, of course, the amount of antioxidant which is used will depend to some extent upon how effective the antioxidant is. In most cases, the amount of antioxidant which is used will make up from about 0.05% to about 2.0% of the compositions of the invention. When referring to the antioxidants as "edible" we mean that they may be eaten in the quantities in which they are used as antioxidants by either humans or animals without any deleterious effect resulting therefrom. The antioxidant employed in the production of the preferred vitamin concentrate compositions of this invention is such that when mixed with other materials and then appropriate amounts of said wax-like material, and the wax-like material containing the other vitamin concentrate ingredients is heated above the melting point of the wax-like material, the mass at that temperature will be molten and when such mass is cooled to room temperature it will be substantially solid and uniform throughout and in the form of what in general may be termed a solid solution.

The inclusion of an edible surface-active material in the compositions of our invention greatly increases the ease of digestibility of the dry carriers. The preferred vitamin concentrate products of the present invention contain from about 0.5% to about 50% by weight of the product of an edible surface-active agent and such agent can be selected from a large group of such compounds among which may be mentioned fatty acid esters of sorbitans and mannitans, polyethylene oxide condensation products of fatty acid esters of sorbitans and mannitans, fatty acid esters of polyethylene glycols, lecithin, gums, etc. In fact any edible surface-active material may be employed, if desired. When referring to the surface-active agents as "edible," we mean that these materials may be eaten by either humans or animals in the amounts in which they are employed in the products of the invention without any deleterious effects resulting therefrom. Among the many edible surface-active agents which can be employed in preparing the preferred vitamin concentrate products of our invention are fatty acid esters prepared from polyethylene glycols having a molecular weight of from about 200 to about 4000 and fatty acids containing from 8 to 22 carbon atoms such as caprylic acid, capric acid, lauric acid, myristic acid, palmitic acid, oleic acid, recinoleic acid, stearic acid, hydroxy stearic acid, arachidic acid, behenic acid, mixtures of such acids, etc.; fatty acid esters prepared from sorbitans or mannitans and any of the fatty acids containing from 8 to 22 carbon atoms such as the fatty acids listed above; polyethylene oxide condensation products of the fatty acid esters or sorbitans or mannitans, said condensation products containing from 5 to 90 ethylene oxide units per molecule; phosphatides such as lecithin; natural gums such as gum acacia and gum tragacanth; etc.

A non-puffed vegetable flour can be incorporated into the compositions of this invention, if desired. The amount of non-puffed vegetable flour which is incorporated into the compositions of our invention can vary, of course, but in no case should it exceed about 50% by weight of the final product and preferably it should not make up more than about 35% of the final product, if a non-puffed vegetable flour is to be used.

Among the many vegetable flours which can be employed in preparing the preferred vitamin concentrate compositions of our invention are finely ground soybean meal, corn germ meal, cottonseed meal, linseed meal, wheat germ meal, corn meal, alfalfa leaf meal, wheat bran, oat meal, peanut meal, bolted rice polish, wheat flour, etc. The vegetable flour consists of rather finely divided particles of the vegetable material, the majority of which will pass through a 60 mesh screen, and in most cases it is preferred that practically all will pass through a 60 mesh screen and the majority of the particles be of a size that they will pass through a 100 mesh screen.

Accordingly, the preferred vitamin concentrate embodiment of this invention may be practiced by intimately combining (a) one or a combination of two or more of said wax-like materials, (b) one or a combination of two or more of said fat-soluble vitamin containing materials which are absorbed on a puffed or exploded material and ground to a powder, (c) one or a combination of two or more of said surface-active agents, and (d) one or a combination of two or more of said antioxidants. Said substances (a), (b), (c) and (d) are so proportioned that (c) is present in an amount equal to 0.5–50% by weight of the total mass, and (a) is present in an amount equal to 15–70% by weight of the total mass.

In order to more fully illustrate the nature of this invention and the manner of practicing the same, the following examples are presented.

GENERAL PROCEDURE FOR PREPARING AND TESTING THE PRODUCTS OF THE EXAMPLES

The vitamin concentrate compositions of the puffed or exploded materials and the absorbed fat soluble vitamin A used in the examples were prepared by adding antioxidants and then lecithin to vitamin A palmitate. The puffed ground material was then added and the resulting mixture thoroughly blended by hand mixing. The puffed material—vitamin A palmitate, antioxidant and lecithin blend was then added to other ingredients which will be later described, in order to prepare a vitamin A concentrate composition, using a wax-like material, which was added to a vitamin A deficient Basal ration and mixed therewith using a Brower "Whirlwind" type feed mixer.

The wax-like material vitamin concentrate composition was prepared by melting a normally solid wax-like material, and adding the melt to the preheated ingredients and heating the entire composition while mixing and blending the ingredients. The molten mass was then added to a perforated preheated container which was spun on its axis, while still heating said container, at a sufficient rate of speed so that solid spheroidal particles landed about fifteen feet from the container. Care was taken to protect the final spheroidal particles when they fell, in order to prevent their being soiled. These solid spheroidal vitamin concentrate particles were then added in varying amounts to the vitamin A deficient Basal ration and the entire composition was fed to chicks. After four weeks, a representative sample of freshly removed livers were analyzed for vitamin A.

The general testing procedure employed in the examples was as follows: All tests were conducted on one-day old White Vantress cockerels. The test groups contained 16 to 20 chicks, and were divided into two equal lots of chicks. All experiments reported were of 28 days duration. During this time, the chicks were housed in electrically heated starting batteries and supplied with food and water ad libitum. The temperature of the starting batteries was maintained from about 80 to about 85° F. A special effort was made to minimize the effect of cage position upon the biological response by placing different lots of the same group in different cage positions. All chicks and feed were weighed at the beginning of the experiment, and all pertinent data was recorded at weekly intervals, except that the amount of vitamin A stored in the liver was determined at the end of four weeks. The individual rations for the chicks were prepared at the beginning of the experiments from a freshly mixed large batch of vitamin A deficient Basal ration mixed in a vertical Brower Whirlwind type mixer, using a mixing cycle of 20 minutes.

The method of analyzing the livers for vitamin A was as follows: The weighed sample, usually consisting of three livers, is placed in a Waring Blendor, and 45 ml. of ethanol and 5 ml. of 50% aqueous potassium hydroxide are added to the Waring Blendor and the mixture is mixed for one minute. The ethanol serves as a solvent. The potassium hydroxide is present to saponify the fats and vitamin A. The potassium salts of these fatty acids, which form upon saponification, are soluble in the aqueous phase. Saponification is accomplished by transferring the contents of the Blendor to a 250 ml. low actinic boiling flask with 15 ml. of ethanol. The materials are then refluxed using a boiling water bath for 20 minutes and an all glass system in order to form the above-mentioned potassium salts of the fatty acids. The materials are then cooled to room temperature and transferred to a 100 ml. low actinic graduated cylinder using 15 ml. of ethanol. The volume of the solution is now measured and the solution is shaken and then allowed to stand for 30 minutes. The 15 ml. of ethanol used here is used as a diluent. A 12.5 ml. aliquot of the supernatant liquid is then pipetted into a 50 ml. glass stoppered centrifuge tube and 10 ml. of distilled water and 20 ml. of Skelly Solve B are then added thereto. Skelly Solve B is a hexane pentane mixture with a boiling range of 30° to 65° C. obtained from the Skelly Oil Company. The mixture is then shaken vigorously for approximately 1 minute, and then centrifuged until complete separation of the two phases is effected (about 2 minutes). Substantially all of the potassium salt of vitamin A material is in the hexane phase. An aliquot of the Skelly Solve B layer is pipetted into an Evelyn Colorimeter test tube. The aliquot taken is calculated to obtain approximately 12 units of vitamin A. The solution is then evaporated to dryness and the residue is immediately taken up in 2 ml. of chloroform.

An Evelyn Photoelectric Colorimeter, Macro is then used. The 620 mu filter is placed in position and the zero point of the galvanometer is checked and the chorimeter is then set at 100% transmission using a blank of 2 ml. of chloroform and 10 ml. of antimony trichloride reagent. An assay tube is then placed in the colorimeter and 10 ml. of antimony trichloride reagent is then rapidly added to the assay tube from the automatic pipette. The galvanometer reading at the pause point is taken and recorded.

100 milligrams of the U.S.P. vitamin A reference solution, accurate to the nearest 1/10 mg. is placed in a 250 ml. low actinic boiling flask. 25 ml. of ethanol and 3 ml. of 50% aqueous potassium hydroxide solution are then added to the boiling flask and the solution is refluxed for 15 minutes in a boiling water bath using an all-glass system including an all-glass water-cooled condenser. The solution is then cooled to room temperature and transferred to an amber separatory funnel using 60 ml. of water. 75 ml. of reagent grade ether are then added to the separatory funnel. The separatory funnel is shaken for about 1 minute and the phases are allowed to separate. The aqueous phase is drawn off into a second separatory funnel and extracted three times, by each time shaking the aqueous phase with 30 ml. of reagent grade ether. The ether extracts are then consolidated and washed with water in order to remove any residual alkali and alcohol present and the consolidated ether extracts are then carefully diluted to 250 ml. by the addition of further reagent grade ether. A 25 ml. aliquot is then taken and placed in a 200 ml. volumetric flask and taken to volume using reagent grade chloroform. This solution contains approximately 5 units of vitamin A per ml. Aliquots of 1, 2, 3 and 4 ml. of this solution are pipetted in duplicate into colorimeter tubes. The chloroform is then evaporated using a stream of dry nitrogen and the sample residues are then taken up in 2 ml. of reagent grade chloroform. The colorimetric values obtained with these tubes are then used to construct a standard curve. The units of vitamin A per tube of unknown are then determined by correlating the readings obtained using the unknowns with the colorimeter readings obtained which used the standards and were plotted on the standard curve. Using the values obtained with the sample eluates, the potency of the sample is calculated from the following formula:

$$\text{Potency in units/gram} = \frac{A}{BC}$$

where $A$ = the units of vitamin A in the aliquot of the sample eluate in the 2 ml. of chloroform read from the standard curve.
$B$ = the volume of aliquot.
$C$ = the dilution factor (concentration of sample in the Skelly Solve B expressed as grams per milliliter).

The vitamin A deficient Basal ration used was as follows:

| Ingredients: | Pounds per hundred weight |
|---|---|
| Ground milo | 60.0 |
| Soybean oil meal (44% protein) | 34.0 |
| Steamed bone meal | 2.0 |
| Ground limestone | 1.5 |
| Salt (NaCl) | 0.5 |
| Vitamin and mineral supplements [1] | 2.0 |
| | 100.0 |

[1] A two pound per hundred weight mixture of ingredients which supplied effective amounts of the vitamins and minerals as shown below:

| | | |
|---|---|---|
| Riboflavin | mg | 200 |
| dl-Calcium pantothenate | mg | 500 |
| Niacin | mg | 1,200 |
| Choline chloride (100% basis) | mg | 2,000 |
| Vitamin $B_{12}$ | mg | 0.5 |
| Vitamin $D_3$ | i.c.u | 40,000 |
| Procaine penicillin | mg | 200 |
| Manganese sulfate | g | 10 |
| Soybean oil meal | | ([1]) |

[1] Enough added to bring total weight of vitamin supplements and trace minerals to 2.0 lbs. per hundred weight.

The table below lists the different ingredients and amounts thereof which made up the vitamin A concentrates. Varying amounts of these concentrates were added to the vitamin A deficient Basal ration, and the ration was then fed to chicks.

The control compositions were prepared in the same manner as the compositions of this invention except that Polyose A, or other non-puffed material was substituted for the ground puffed material.

Varying amounts of the above concentrates were added to the vitamin A deficient Basal ration, mixed as aforedescribed, and fed to the chicks. Livers were removed at the end of four weeks and assayed, as described, for vitamin A.

FORMULA FOR THE VITAMIN A CONCENTRATES ADDED TO THE VITAMIN A DEFICIENT BASAL RATION

| Ingredients (Grams) | Control | Formula #1 | Formula #2 | Formula #3 |
|---|---|---|---|---|
| Vitamin A Palmitate | 2.450 | 2.450 | 2.450 | 2.450 |
| Butylated Hydroxy Anisole | 0.222 | 0.222 | 0.222 | 0.222 |
| Butylated Hydroxy Toluene | 0.278 | 0.278 | 0.278 | 0.278 |
| Lecithin | 16.333 | 16.333 | 6.333 | 26.222 |
| Polyose A | 8.222 | | | |
| Stearic Acid | 5.000 | 5.000 | | |
| Nutrisoy Flour | 3.917 | 3.917 | | |
| B-Square Wax (Microcrystalline) | 5.000 | 5.000 | 5.000 | 5.000 |
| Paraflint (synthetic high melting wax) | 8.333 | 8.333 | 8.333 | 8.333 |
| Ethoxyquin | 0.245 | 0.245 | 0.245 | 0.245 |
| Ground Puffed Rice | | 8.222 | 18.222 | 7.25 |
| Corn Oil | | | 8.917 | |
| Total | 50.000 | 50.000 | 50.000 | 50.000 |

Varying amounts of the above concentrates were added to the vitamin A deficient Basal ration, mixed as aforedescribed, and fed to the chicks. Livers were removed at the end of four weeks and assayed as described for vitamin A.

Polyose A was used in the control formulations as this is a typical prior art formulation. Polyose A is a glucose polymer solid derived from starch by depolymerization followed by heat polymerization as described in detail in the Durand Patent No. 2,563,014.

The tables summarize the results obtained using the novel compositions of this invention.

As the above table has shown, the compositions of this invention, when fed to chicks, are effective in increasing the biological availability of vitmain A. This is aptly demonstrated when the last column headed "percent of vit. A palmitate stored in a liver as vit. A after 4 wks." of Example III is read. This column shows that using the compositions of this invention, the amount of vitamin A stored in a liver was unexpectedly increased from 33.3% for a control composition, to a high of 51.5% for the compositions of this invention. This 18% improvement is extremely significant as one versed in the art will realize.

*Example V*

The purpose of this example is to illustrate that materials other than ground puffed rice can be used to absorb the vitamin A palmitate, and that the puffed materials are more effective in increasing the biological availability of fat soluble vitamin than non-puffed cereal or synthetic carbohydrate materials in finely divided flour form. Another purpose is to illustrated the superiority of the compositions of this invention when compared with controls and a competitive product.

TABLE #1.—INCREASE IN THE AMOUNT OF VITAMIN A STORED IN THE LIVER WHEN USING THE COMPOSITIONS OF THIS INVENTION

| Example | No. of chicks | Concentrate formula added to the vitamin A deficient basal ration | Amt. of feed prepared (lbs.) | Amt. of concentrate added to the feed (gms.) | Potency of vitamin A palmitate used (I.U./GM.) | Amt. of vitamin A fed (I.U./lb. of feed) | Average gain/ bird (grams) | Feed-Gain Ratio | Total amt. of vit. A ingested in 4 wks. (I.U.) | Total amt. of feed consumed (grams) (4 wks.) | Average/liver of the No. of total units of vit. A found in 3 livers at the end of 4 wks. (I.U./ liver) | Total wt. of the 3 livers (grams) | Percent of ingested vit. A palmitate stored in a liver as vit. A after 4 wks. |
|---|---|---|---|---|---|---|---|---|---|---|---|---|---|
| I | 18 | Control | 25 | 1.2658 | 47,400 | 2,400 | 385.8 | 1.890 | 3,855 | 729.2 | 520 | 32.2 | 13.5 |
|  | 18 | 1 | 25 | 1.2685 | 47,300 | 2,400 | 390.4 | 1.885 | 3,890 | 735.9 | 888 | 33.0 | 22.8 |
|  | 18 | 1 | 25 | 1.3072 | 45,900 | 2,400 | 396.1 | 1.833 | 3,838 | 726.0 | 755 | 38.8 | 19.7 |
| II | 18 | Control | 25 | 2.5316 | 47,400 | 4,800 | 407.0 | 2.076 | 8,933 | 844.9 | 2,321 | 34.4 | 26 |
|  | 18 | 1 | 25 | 2.5369 | 47,300 | 4,800 | 394.3 | 1.853 | 8,329 | 787.8 | 2,945 | 35.1 | 35.4 |
| III | 18 | Control | 25 | 2.6143 | 45,900 | 4,800 | 394.3 | 1.983 | 7,725 | 730.6 | 3,395 | 34.0 | 43.9 |
|  | 18 | 1 | 30 | 3.0380 | 47,400 | 4,800 | 412.8 | 1.988 | 8,655 | 818.6 | 2,880 | 32.3 | 33.8 |
|  | 18 | 2 | 30 | 3.1373 | 45,900 | 4,800 | 447.9 | 1.910 | 9,045 | 855.5 | 4,655 | 34.8 | 51.5 |
|  | 18 | 3 | 30 | 2.6063 | 55,250 | 4,800 | 459.3 | 1.883 | 9,144 | 864.9 | 3,720 | 37.4 | 40.7 |
| IV | 18 | Control | 30 | 2.7170 | 53,100 | 4,800 | 395.9 | 1.948 | 8,154 | 771.2 | 3,350 | 32.6 | 41.1 |
|  | 16 | 1 | 20 | 2.1239 | 45,200 | 4,800 | 353.1 | 1.746 | 6,518 | 616.5 | 1,545 | 33.5 | 23.7 |
|  | 15 | 1 | 20 | 2.1381 | 44,900 | 4,800 | 319.7 | 1.839 | 6,216 | 587.9 | 2,385 | 27.4 | 38.4 |

FORMULA FOR THE DIFFERENT VITAMIN A CONCENTRATES ADDED TO THE VITAMIN A DEFICIENT BASAL RATION

| Ingredients (Grams) | Control #1 | Control #2 | Formula #1 | Formula #2 | Formula #3 | Formula #4 | Formula #5 | Control #3 | Formula #6 |
|---|---|---|---|---|---|---|---|---|---|
| Vitamin A palmitate | 2.450 | 2.450 | 2.450 | 2.450 | 2.450 | 2.450 | 2.450 | 2.450 | 2.450 |
| Butylated hydroxy anisole | 0.222 | 0.222 | 0.222 | 0.222 | 0.222 | 0.222 | 0.222 | 0.222 | 0.222 |
| Butylated hydroxy toluene | 0.278 | 0.278 | 0.278 | 0.278 | 0.278 | 0.278 | 0.278 | 0.278 | 0.278 |
| Ethoxyquin | 0.245 | 0.245 | 0.245 | 0.245 | 0.245 | 0.245 | 0.245 | 0.245 | 0.245 |
| Stearic acid | 5.000 | 5.000 | 5.000 | 5.000 | 5.000 | 5.000 | 5.000 | 5.000 | 5.000 |
| Nutrisoy flour | 4.000 | 4.000 | 5.000 | 4.000 | 4.000 | 4.000 | 4.000 | 4.000 |  |
| B-Square wax (microcrystalline) | 5.000 | 5.000 | 5.000 | 5.000 | 5.000 | 5.000 | 5.000 | 5.000 | 5.000 |
| Paraffint wax (synthetic microcrystalline) |  |  |  |  |  |  |  |  |  |
| Lecithin | 8.333 | 8.333 | 8.333 | 8.333 | 8.333 | 8.333 | 8.333 | 8.333 | 8.333 |
| Ground puffed rice | 16.333 | 16.333 | 16.333 |  |  |  |  | 16.333 | 20.333 |
| Ground puffed wheat |  |  | 8.222 |  |  |  |  |  | 8.222 |
| Ground puffed barley ("KIX") |  |  |  | 8.222 |  |  |  |  |  |
| Ground puffed corn |  |  |  |  | 8.222 |  |  |  |  |
| Ground popped popcorn |  |  |  |  |  | 8.222 |  |  |  |
| Ground non-popped popcorn |  |  |  |  |  |  | 8.222 |  |  |
| Nutrisoy flour | 8.222 | 8.222 |  |  |  |  |  | 8.222 |  |
| Polyose A |  |  |  |  |  |  |  |  |  |
| Total | 50.083 | 50.083 | 50.083 | 50.083 | 50.083 | 50.083 | 50.083 | 50.083 | 50.083 |

TABLE #2.—INCREASE IN THE AMOUNT OF VITAMIN A STORED IN THE LIVER WHEN USING THE COMPOSITIONS OF THIS INVENTION

| Example | No. of chicks | Concentrate formula added to the vitamin A deficient Basal ration | Amt. of feed prepared (lbs.) | Amt. of concentrate added to the feed (gms.) | Potency of vitamin A palmitate used (I.U./GM.) | Amt. of vitamin A fed (I.U./lb. of feed) | Average gain/bird (grams) | Feed-Gain Ratio |
|---|---|---|---|---|---|---|---|---|
| V | 20 | Control #1 | 40 | 2.9135 | 65,900 | 4,800 | 349.0 | 2.001 |
|   | 20 | Control #2 | 40 | 3.0868 | 62,200 | 4,800 | 386.7 | 2.056 |
|   | 18 | Competitive Concentrate | 40 | 0.7273 | 264,000 | 4,800 | 340.6 | 2.034 |
|   | 20 | 1 | 40 | 3.0380 | 63,200 | 4,800 | 374.0 | 1.876 |
|   | 20 | 2 | 40 | 2.9091 | 66,200 | 4,800 | 396.4 | 1.790 |
|   | 20 | 3 | 40 | 2.7948 | 68,700 | 4,800 | 404.6 | 1.886 |
|   | 20 | 4 | 40 | 2.9630 | 64,800 | 4,800 | 388.5 | 1.881 |
|   | 20 | 5 | 40 | 2.9268 | 65,600 | 4,800 | 409.3 | 1.884 |
|   | 20 | Control #3 | 40 | 3.0622 | 62,700 | 4,800 | 365.5 | 2.053 |
|   | 20 | 6 | 40 | 3.1578 | 60,800 | 4,800 | 353.6 | 2.017 |

| Example | No. of chicks | Concentrate formula added to the vitamin A deficient Basal ration | Total amt. of vit. A ingested in 4 wks. (I.U.) | Total amt. of feed consumed (grams) (4 wks.) | Average/liver of the no. of total units of vit. A found in 3 livers at the end of 4 wks. (I.U./liver) | Total wt. of the 3 livers (grams) | Percent of ingested vit. A palmitate stored in a liver as vit. A after 4 wks. |
|---|---|---|---|---|---|---|---|
| V | 20 | Control #1 | 7,383 | 698.3 | 1,575 | 29.0 | 21.3 |
|   | 20 | Control #2 | 8,406 | 795.1 | 1,690 | 32.8 | 20.1 |
|   | 18 | Competitive Concentrate | 7,325 | 692.8 | 1,940 | 31.4 | 26.5 |
|   | 20 | 1 | 7,418 | 701.6 | 3,115 | 34.8 | 42.0 |
|   | 20 | 2 | 7,502 | 709.6 | 2,540 | 37.1 | 33.9 |
|   | 20 | 3 | 8,068 | 763.1 | 2,940 | 43.4 | 36.4 |
|   | 20 | 4 | 7,726 | 730.8 | 2,595 | 34.4 | 33.6 |
|   | 20 | 5 | 8,153 | 771.1 | 2,680 | 38.3 | 32.9 |
|   | 20 | Control #3 | 7,933 | 750.4 | 1,165 | 33.0 | 14.7 |
|   | 20 | 6 | 7,541 | 713.2 | 2,835 | 30.5 | 37.6 |

As the examples have shown, the compositions of this invention are effective in increasing the biological availability of fat-soluble vitamins. This is demonstrated by the increased amount of vitamin A stored in the liver when using the compositions of this invention as compared to the amount of vitamin A stored in the liver using the control compositions and an animal feed prepared using a competitive concentrate.

Particular attention is called, in Example V, to Formula #5 and control #3. Both formulas are identical except that Formula #5 contains ground popped popcorn and control #3 contains an equivalent amount of ground non-popped popcorn in lieu of the popped popcorn. An inspection of the results obtained, as shown in Table #2, through incorporating these compositions into a poultry feed and feeding said feed to chicks reveals the following. The chicks stored 32.9% of the ingested vitamin A palmitate in the livers as vitamin A when Formule #5, containing popped popcorn, was added to their feed. In contrast, the chicks stored only 14.7% of the ingested vitamin A palmitate in the livers as vitamin A when control #3, containing non-popped popcorn, was added to their feed. This demonstrates that that the biological availability of a fat-soluble vitamin is increased by feeding chicks a composition containing a fat-soluble vitamin absorbed on an edible puffed material.

While this invention has been described in terms of certain preferred embodiments and illustrated by means of specific examples, the invention is not to be construed as limited except as set forth in the following claims.

We claim:
1. A biologically available, fat soluble vitamin containing composition of matter comprising a multiplicity of small, substantially solid spheroidal particles comprising:
   (a) a normally solid wax-like material having a melting point of at least 45° C.,
   (b) a fat soluble vitamin containing material absorbed on an edible puffed material, said fat soluble vitamin containing material being present in amounts up to about equal parts by weight per part of said puffed material and amounts up to about 40% of the total weight of said composition, and
   (c) an edible antioxidant,
said substances, (a), (b) and (c) being intimately combined with each other, said spheroidal particles having (a), (b) and (c) in substantially solid mass, said (a) being present in amounts of from about 10% to about 75% by weight of the combined weight of said composition.

2. A process for increasing the amount of fat soluble vitamins biologically available to animals consisting essentially of the step of feeding to animals a composition of matter comprising a multiplicity of small, substantially solid spheroidal particles comprising:
   (a) a normally solid wax-like material having a melting point of at least 45° C.,
   (b) a fat soluble vitamin containing material absorbed on an edible puffed material, said fat soluble vitamin containing material being present in amounts up to about equal parts by weight per part of said puffed material and amounts up to about 40% of the total weight of said composition,
   (c) an edible antioxidant,
said substances, (a), (b) and (c) being intimately combined with each other, said spheroidal particles having (a), (b) and (c) in substantially solid mass, said (a) being present in amounts from about 10% to about 75% by weight of the combined weight of said composition.

3. The composition of claim 1, wherein said puffed material has a bulk density such that 100 cc. of said puffed material weighs up to about 18 grams.

4. The composition of claim 3, wherein said puffed material is puffed rice.

5. The composition of claim 3, wherein said puffed material is puffed barley.

6. The composition of claim 3, wherein said puffed material is puffed wheat.

7. The composition of claim 3, wherein said puffed material is puffed corn.

8. The composition of claim 3, wherein said puffed material is popped corn.

9. The composition of claim 1, wherein an edible surface active material is present.

10. A process according to claim 2, wherein said puffed material has a bulk density such that 100 cc. of said puffed material weighs up to about 18 grams.

11. A process according to claim 2, wherein an edible surface active material is present.

12. The process of claim 10 wherein said puffed material is puffed rice.

13. The process of claim 10 wherein said puffed material is puffed barley.

14. The process of claim 10 wherein said puffed material is puffed wheat.

15. The process of claim 10 wherein said puffed material is puffed corn.

16. The process of claim 10 wherein said puffed material is popped corn.

References Cited by the Examiner

UNITED STATES PATENTS

| | | |
|---|---|---|
| 2,120,138 | 6/1938 | Mathews et al. |
| 2,275,565 | 3/1942 | Sherwood et al. _____ 99—11 |
| 2,489,267 | 11/1949 | Chapin et al. |
| 2,777,797 | 1/1957 | Hochberg et al. _____ 167—81 |

A. LOUIS MONACELL, *Primary Examiner.*

B. H. STRIZAK, *Examiner.*

S. J. BAICKER, D. J. DONOVAN, *Assistant Examiners.*